Aug. 2, 1932.  F. KROMSCHRÖDER  1,869,485
GAS METER
Filed Nov. 8, 1927  2 Sheets-Sheet 1
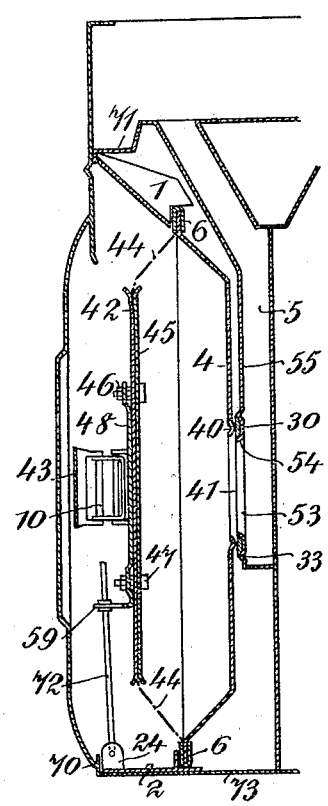
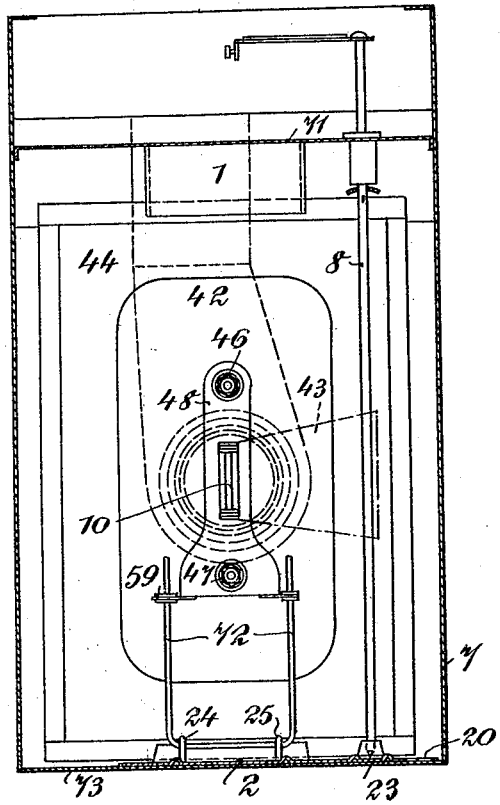
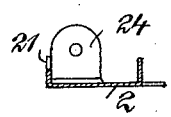
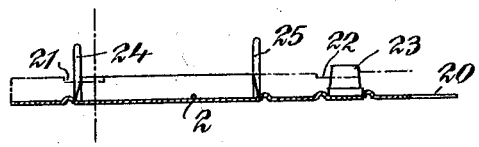
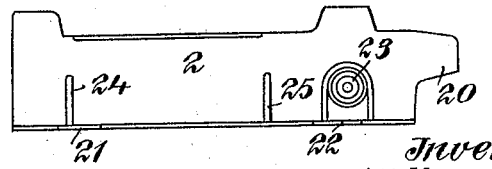
Inventor:
Friedrich Kromschröder
by:
Watson, Coit, Morse & Grindle
Attorney.

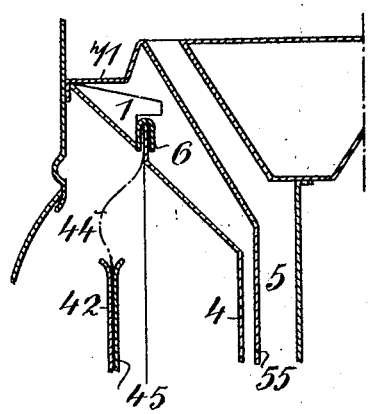
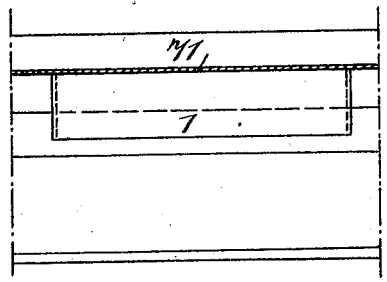
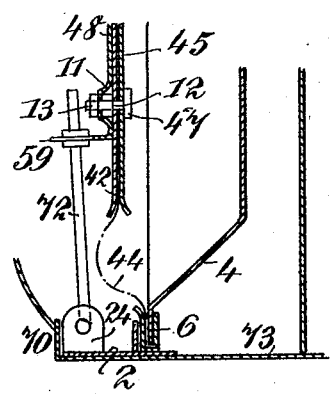
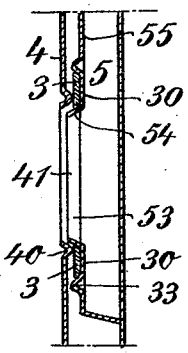
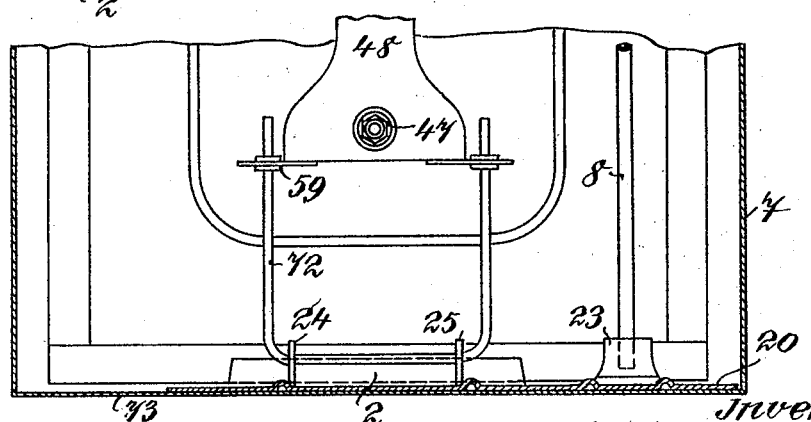

Patented Aug. 2, 1932

1,869,485

UNITED STATES PATENT OFFICE

FRIEDRICH KROMSCHRÖDER, OF OSNABRUCK, GERMANY, ASSIGNOR TO G. KROM-SCHRODER AKTIENGESELLSCHAFT, OF OSNABRUCK, GERMANY, A CORPORATION OF GERMANY

GAS METER

Application filed November 8, 1927, Serial No. 231,920, and in Germany November 12, 1926.

This invention comprises improvements in and connected with gas meters and is concerned with meters of the kind comprising removable bellows boxes or diaphragm chambers comprising a pan device having a diaphragm secured thereto.

One object of the invention is to provide a meter in which the bellows box is readily removable by the simple release of readily accessible devices.

A further object is to fix the bellows box with joint-making contact by the aid of presser devices operating at the rim portions of said box.

Another object is to fix the bellows box by the aid of presser devices and so that even and good joint-making contact is effected and no soldering operations within the meter are necessary.

Yet another object is to secure the bellows box within the meter by the aid of wedge devices operating between the meter casing and rim portions of said box, said wedge devices preferably having locating means adapted for preventing them from shifting from the operative position.

Other objects include, centering or locating means adapted for ensuring correct positioning of the bellows box when tightly jointed against a partition or internal wall of the meter, and bearing devices conveniently mounted on the wedge devices.

The invention and its objects will be fully explained by the description of examples illustrated by the drawings, in which:—

Figure 1 is a front elevation of a gas meter with the front wall removed for displaying the improved arrangement of parts within.

Figure 2 is a transverse sectional elevation of the said meter.

Figure 3 is a detail sectional view illustrating parts similar to those seen in the upper portion of Figure 2 but to a larger scale and with the diaphragm not distended.

Figure 4 is a detail sectional view illustrating parts similar to those seen in the lower portion of Figure 2 but also to a larger scale and with the diaphragm not distended.

Figure 5 is a front elevation of Figure 3.

Figure 6 is a longitudinal section of a lower wedge device,

Figure 7 being a plan and

Figure 8 a cross section of the same.

Figure 9 is a view to a larger scale of the parts seen in the lower portion of Figure 1.

Figure 10 is a view to a larger scale of diaphragm parts seen in Figure 2.

The diaphragm casing or pan 4 supports discs 42 and 45 by means of leather 44, and this diaphragm device constitutes, as is known, the operative part and is therefore, connected to the counting-mechanism and valve operating mechanism. The connection is effected by means of an oscillatory arm 43, shown in chain lines in Figure 1, which is secured on the rotatable rod 8. The latter passes through the partition wall 71 and is then connected with the so-called valve operating and counting mechanism which, for the sake of clearness, is not illustrated. The diaphragm pan 4 has, around a central opening 41, a ridge or rim 40, opposite which a packing-ring 3 is disposed in a recess 30 in the front wall 55 of the appropriate gas passage 5. The said ring is bounded by a ridge 33 surrounding it on the outside.

According to the invention the diaphragm arrangement is held in the gas-meter by the exertion on the edge of the pan of a rearwardly acting pressure. Owing to this pressure the rim 40 bears tightly on the packing ring 3 and in combination with the raised rim 54 of the opening 53, ensures at the same time certain adjustment both in the vertical and horizontal directions. The securing of the diaphragm device is effected in the constructional example illustrated simply and solely by two wedge devices, the gas meter casing being employed as an abutment. The upper wedge device 1 is sprung-in between one side of the upper cover or partition 71 of the gas meter and the edge of the diaphragm pan and the lower wedge or fixing device 2 is inserted between a lower turned-up edge 70 of the casing and, similarly the edge of the diaphragm pan. The said edge of the diaphragm pan is furnished with a clamp ring 6, U-shaped in cross-section running around the pan and also covering the connection with the leather 44. The manner of securing the diaphragm with the said wedges 1 and 2 is as follows:—

The diaphragm-casing or pan 4 is assembled with the discs 42 and 45 outside the gas-meter and is then put by hand into its correct position. Such position is readily found due to the ridges and packing devices best seen in Figure 10. Next the upper wedge 1 is inserted, the diaphragm pan slipping forward somewhat at the bottom. Then the lower wedge 2 is inserted, the diaphragm pan being pressed back by hand at the bottom. If the wedge members 1 and 2 are of correct size and are of suitable shape an arrangement is obtained which is capable of yielding resiliently at various places and which thus allows of substantial pressures so that perfect packing is fully ensured. The lower wedge 2 in the constructional example illustrated has a special shape which may be seen from Figures 6, 7 and 8. A projection 20 at the right hand end abuts, when positioned, against the right hand lateral wall 7 of the gas meter so that the wedge may thereby be inserted in the gas meter precisely and securely. The front edge of the wedge is recessed at two points 21 and 22 and accommodates in these recesses bent-in portions of the bent-up front rim 70 of the gas meter, the said bent-in portions being produced as flat tongues for the purpose. The position of the wedge 2 in the gas-meter is in this manner determined positively, the wedge being unable to move either laterally or upwardly.

As a consequence this wedge may readily be utilized as a support for other constructional parts. It carries the footstep bearing 23 for the rod 8 (Figures 6 and 7) and, furthermore, two small cheeks 24, 25 which are either soldered thereto or are in the form of pressed up tongues. The said cheeks serve as mountings for the known guide wire 72, bent in the shape of a U for the diaphragm plate 42.

The result of this is that the foot-step bearing 23 and the two cheeks 24, 25 may be soldered on outside the gas meter, thus simplifying the work. Moreover, this is important in the vent of subsequent repairs to the diaphragm being necessary, for the said three parts would otherwise have to be unsoldered from the gas meter base 73 and then soldered afresh on reassembly. This work is now obviated.

No further soldering of the two diaphragm-plates which might damage the leather 44 should be effected on, and on the parts adjacent, the same. With diaphragms in gas meters of similar constructions where soldering is employed to effect the connection, the diaphragm plates are furnished with a sufficiently large central opening which had later to be closed by a special soldered-on sheet-metal cover. This opening with the sheet metal cover soldered thereto is omitted in this invention, in common with constructions of the kind referred to since there is no longer any soldering to be done behind the diaphragm. The diaphragm leather may be disposed, without any gap, between the diaphragm plates 42 and 45, and the said plates 42 and 45 and the diaphragm leather be clamped together as shown in the example of construction illustrated by two screws 46 and 47 or rivets.

Further, to simplify the assembly or disassembly these two screws are utilized to fasten to the diaphragm plate 42 a sheet metal member 48 which carries the upper contact points 59 for the known U-shaped guide wires 72 and the hinge block 10 mounted at the centre of the diaphragm plates. The arm 43 on the rod 8 engages with the said hinge blocks. The screws 46 and 47 are soldered to the rear sheet-metal plate 45 before the assembly of the diaphragm. After the leather 44 has then been mounted the front diaphragm plate 42 is secured by means of the intermediate threaded nuts 12. The metal member 48 in which a depression 11 has been pressed to receive each of the two fixing nuts 12 is then mounted and secured by a second nut 13.

I claim:

1. In a dry gas meter having a gas filled passage provided with a port therein, the combination with a diaphragm carrying pan having a centrally disposed port adapted to cooperate with the port in said conduit, and means disposed on opposite sides of said centrally disposed port and engaging said pan adjacent the periphery thereof for pressing said pan against said passage to effect gastight contact of the surfaces thereof surrounding said ports.

2. In a dry gas meter, the combination with a gas filled passage provided with a port therein, of a diaphragm carrying pan having a port formed therein for cooperation with said first named port, an annular lip formed in said pan and surrounding the port therein, and a seat for engagement by said lip formed in said passage and surrounding the port therein, and means engaging said pan adjacent the periphery thereof for forcing said lip into engagement with said seat to effect a gas-tight joint between said pan and conduit about said ports.

3. In a dry gas meter, the combination with a gas filled passage provided with a port therein, of a diaphragm carrying pan having a centrally disposed port formed therein for cooperation with said first named port, an annular lip formed in said pan and surrounding the port therein, and a seat for engagement by said lip formed in said passage and surrounding the port therein, and means engaging the periphery of said pan and disposed on opposite sides of said centrally disposed port for forcing said lip into engagement with said seat to effect a gas-tight joint between said pan and conduit about said ports.

4. In a dry gas meter having a gas filled passage provided with a port therein and a joint formation around the port, the combination of a diaphragm unit comprising a ported pan with a joint formation around the port, said ports cooperating to provide communication between said passage and said diaphragm unit, and pressure means acting upon said pan adjacent the periphery thereof and on opposite sides of the port thereof for pressing said second mentioned joint formation against said first mentioned joint formation substantially as set forth.

5. In a dry gas meter, a diaphragm unit comprising a ported pan, peripheral clamping means adapted for securing the diaphragm to said pan, and an integral joint formation around the port in said pan, a gas filled passage having a port therein, a packing ring around said last mentioned port, and insertable devices operative between the meter casing and rim portions of said pan for pressing said joint formation against said packing ring substantially as set forth.

6. In a dry gas meter having a ported passage therein, a diaphragm unit comprising a pan with a centrally disposed port cooperating with said ported passage, a diaphragm secured to said pan and wedge devices inserted between rim portions of said pan and the meter casing and adapted for pressing said pan into fluid-tight joint contact with said ported passage in said meter substantially as set forth.

7. In a dry gas meter and in combination, a ported partition, a packing ring surrounding the port in said partition, a ported pan, a lip formation on said pan and surrounding the port thereof, a diaphragm secured to the rim of said pan, and presser devices operating between the rim of said pan and the meter casing for pressing said lip formation into joint-making contact with said packing ring substantially as set forth.

8. In a dry gas meter and in combination, a ported partition, a rim and trough formation around the port in said partition, a packing ring in said trough, a ported pan, a lip formation on said pan and surrounding the port thereof, a diaphragm secured to the rim of said pan, and presser devices operating between the rim of said pan and the meter casing for pressing said lip formation into joint-making contact with said packing ring, said pan being centred by the co-operation between said lip formation and the rim formation on the partition substantially as set forth.

9. In a dry gas meter and in combination, a ported partition, a bellows box having a port coaxial with the port in the partition and a packing interposed between said ports to form a fluid-tight joint, and presser devices, including an insertable wedge device operative between the meter casing and said box substantially as set forth.

10. In a dry gas meter and in combination, a ported partition, a bellows box having a port coaxial with the port in the partition and a packing interposed between said ports to form a fluid-tight joint, and presser devices including an insertable wedge device formed with locating means for engaging the meter casing, said presser devices being operative between the meter casing and said box substantially as set forth.

11. In a dry gas meter and in combination, a ported partition, a bellows box having a port coaxial with the port in the partition and a packing interposed between said ports to form a fluid-tight joint, presser devices including an insertable wedge device operative between the meter casing and said box, and a footstep bearing fixedly mounted on said wedge device substantially as set forth.

12. In a dry gas meter and in combination, a ported partition, a bellows box adapted for seating with fluid-tight jointing against said partition, presser devices including an insertable wedge device operative between the meter casing and said box, bearing devices fixedly located on said wedge device, a diaphragm, and diaphragm guiding means pivotally mounted in said bearings substantially as described.

13. In a dry gas meter, a partition having a port, a bellows box having a port cooperating with said first named port, joint-making means surrounding said ports and interposed between the box and partition, and wedge devices located between the meter casing and the rim of said box and disposed on opposite sides of said ports for securing said box and tightening the joint between said ports substantially as set forth.

14. In a dry gas meter, a partition having a port, a bellows box having a port cooperating with said first named port, joint making means surrounding said ports and interposed between the box and partition, a meter casing surrounding said box, wedge devices operative between the meter casing and the rim of said box for securing said box and tightening the joint between said ports, and locating means on one of said wedge devices substantially as set forth.

15. In a dry gas meter having a ported passage therein, a diaphragm unit comprising a pan with a centrally disposed port cooperating with said ported passage, a diaphragm secured to said pan and wedge devices inserted between rim portions of said pan and the meter casing at opposite sides of the centrally disposed port and adapted for pressing said pan into fluid-tight joint contact with said ported passage in said meter substantially as set forth.

FRIEDRICH KROMSCHRÖDER.